US006962426B2

(12) United States Patent
Slobodin

(10) Patent No.: US 6,962,426 B2
(45) Date of Patent: Nov. 8, 2005

(54) RECIRCULATION OF REFLECTED SOURCE LIGHT IN AN IMAGE PROJECTION SYSTEM

(75) Inventor: David E. Slobodin, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 690 days.

(21) Appl. No.: 09/997,873

(22) Filed: Nov. 29, 2001

(65) Prior Publication Data

US 2003/0099108 A1 May 29, 2003

(51) Int. Cl.[7] .................................................. F21V 13/14
(52) U.S. Cl. ........................ 362/298; 362/293; 362/551
(58) Field of Search ................................ 362/300, 301, 362/298, 293, 551, 296, 583; 313/112, 113; 353/20, 31, 34, 37, 98, 102, 84, 82, 99

(56) References Cited

U.S. PATENT DOCUMENTS

| | | | | |
|---|---|---|---|---|
| 4,427,283 A | * | 1/1984 | Gasper | 355/1 |
| 4,897,771 A | * | 1/1990 | Parker | 362/298 |
| 5,773,918 A | | 6/1998 | Dolan et al. | |
| 5,833,360 A | | 11/1998 | Knox et al. | |
| 6,020,676 A | | 2/2000 | Ury et al. | |
| 6,072,268 A | | 6/2000 | Dolan et al. | |
| 6,123,436 A | * | 9/2000 | Hough | 362/296 |
| 6,591,022 B2 | | 7/2003 | Dewald | |

OTHER PUBLICATIONS http://www.profluxpolarizer.com/polarizers.htm, ProFlux Microwire Technology, Polarizers, visited Sep. 4, 2001, 2 pages.

http://www.fusionlighting.com/technology.htm, Fusion Lighting, Fusion's Technology, visited Nov. 2, 2001, 2 pages.

Kirkpatrick, Douglas A., *Aperture Lamps*, 309–318.

K. Kipling, et al., *High–Brightness Electrodeless Lamp for Projection Displays*, SID Digest, 1999, 1080–1083.

D. Scott Dewald, et al., *Sequential Color Recapture and Dynamic Filtering: A Method of Scrolling Color*, SID Digest, 2001, 1076–1079.

* cited by examiner

*Primary Examiner*—Sandra O'Shea
*Assistant Examiner*—Hargobind S. Sawhney
(74) *Attorney, Agent, or Firm*—Stoel Rives LLP

(57) ABSTRACT

An image projection system achieves improved image brightness and optical efficiency by redirecting some of the unused polychromatic light emitted by a primary light source and reflected by a spatially nonuniform light filter back into the lamp assembly housing the light source. The unused portions of the polychromatic light are re-reflected for transmission through a different spatial region of the light filter, resulting in an approximately 30% increase in probability of transmission. Because recirculation of unused light occurs within the lamp assembly, there is no significant reduction in etendue. In a first preferred embodiment, an interference light filter reflects certain colors of light while transmitting other colors of light. In a second preferred embodiment, a polarizing light filter passes light in certain polarization states while reflecting light in other polarization states.

10 Claims, 7 Drawing Sheets

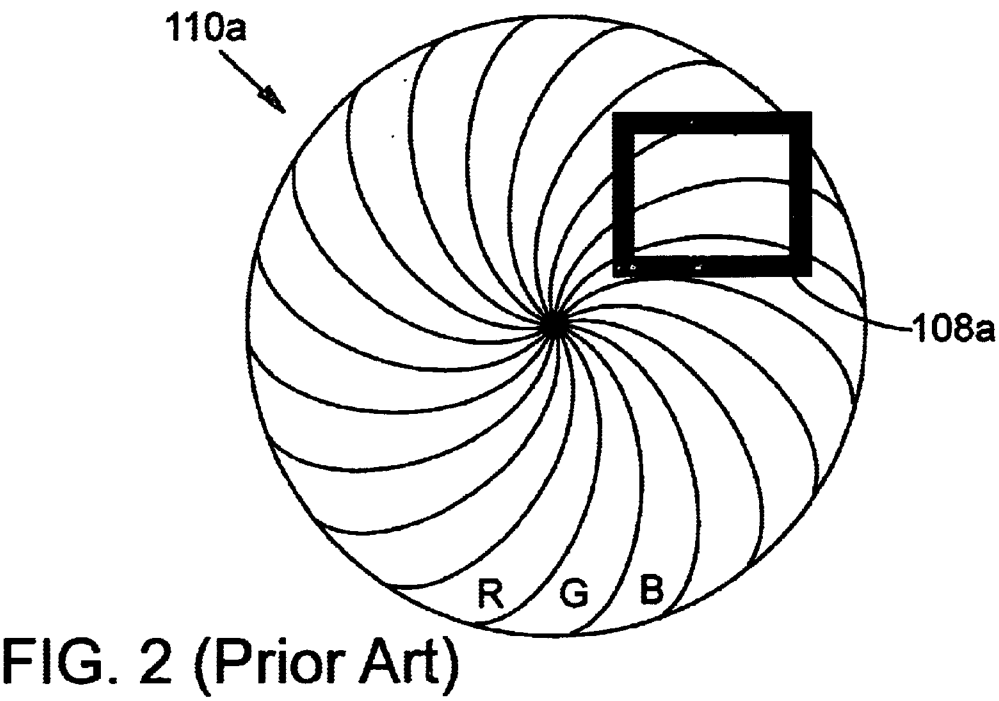
FIG. 2 (Prior Art)
FIG. 3 (Prior Art)
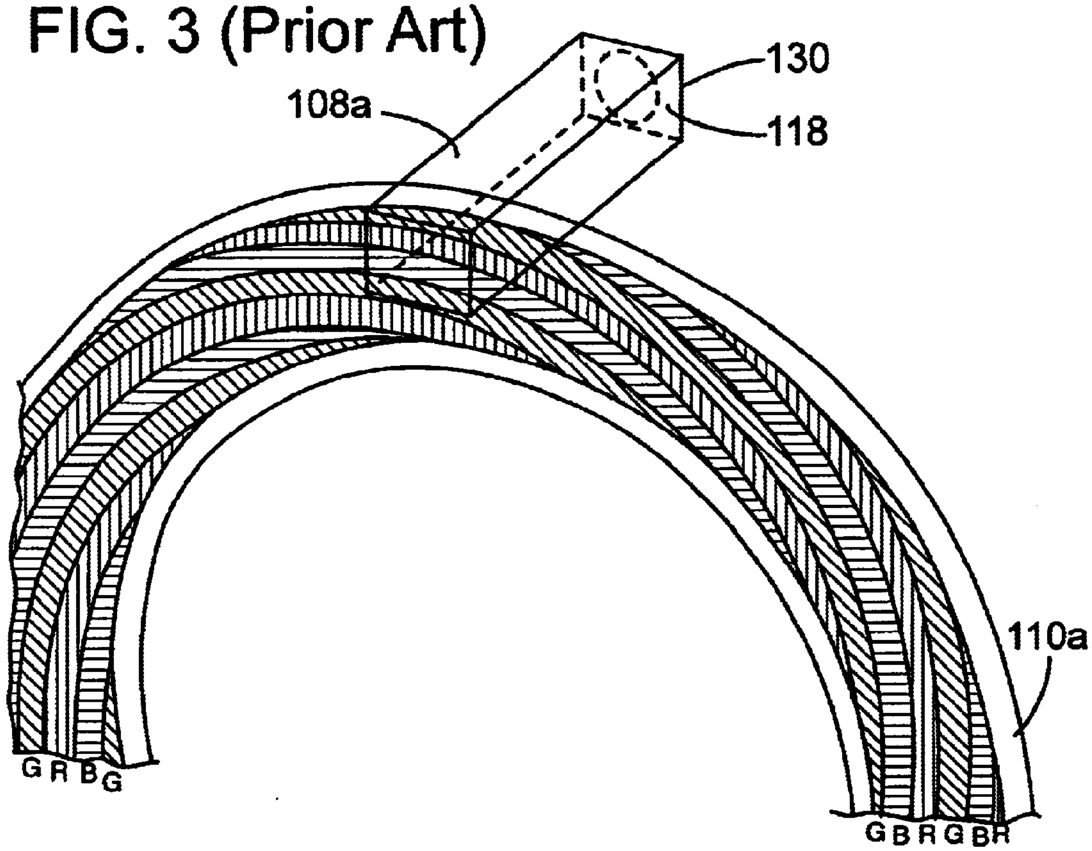

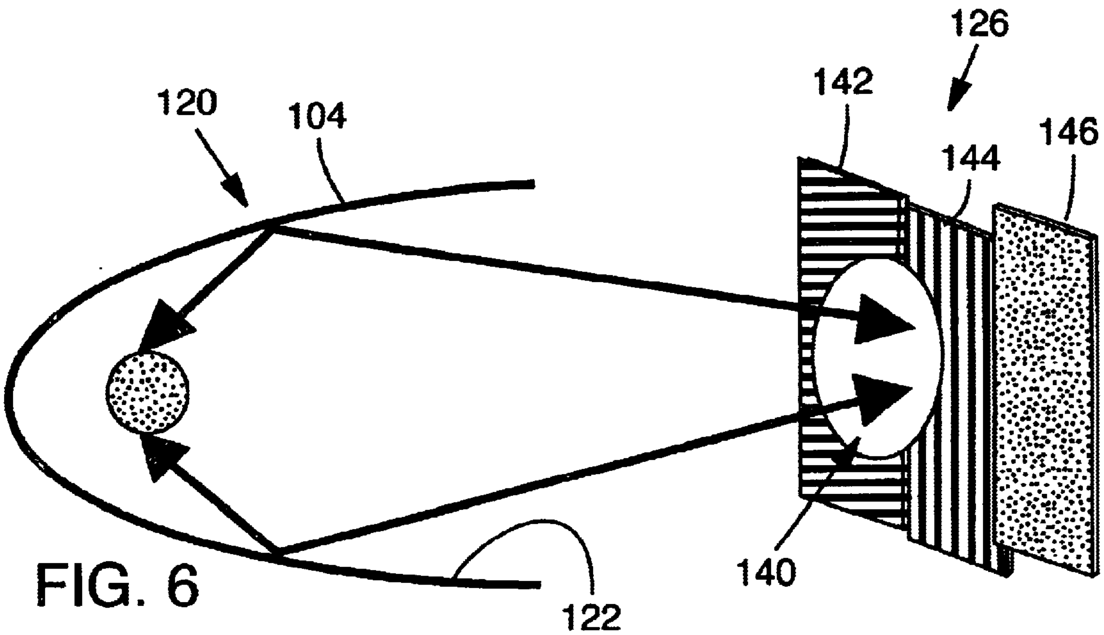
FIG. 6
FIG. 7
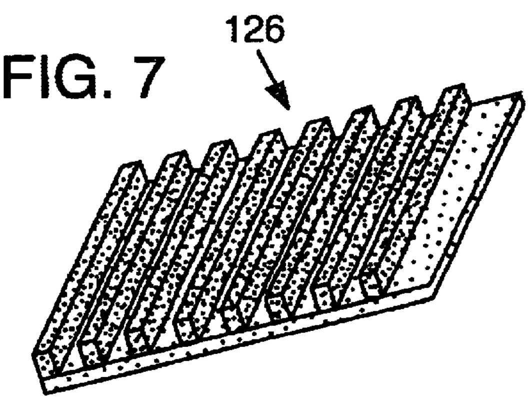
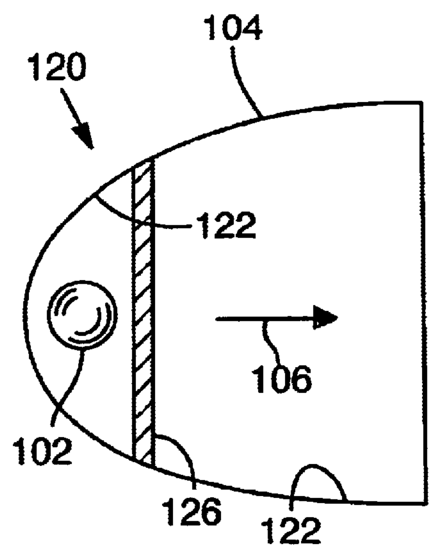
FIG. 8

RECIRCULATION OF REFLECTED SOURCE LIGHT IN AN IMAGE PROJECTION SYSTEM

TECHNICAL FIELD

This invention relates to image projection systems and more particularly to a method for improving the brightness of an image produced by and increasing the optical efficiency of an image projection system.

BACKGROUND OF THE INVENTION

Image projection systems have been used for many years to project motion pictures and still photographs onto screens for viewing. More recently, presentations using multimedia projection systems have become popular for conducting sales demonstrations, business meetings, and classroom instruction.

The following description is presented with reference to a color image projection system implemented with a color wheel but is applicable to other field sequential image projection systems. Color image projection systems operate on the principle that color images are produced from the three primary light colors: red ("R"), green ("G"), and blue ("B"). With reference to FIG. 1, a prior art image projection system 100 includes a primary light source 102 positioned at the focus of a light reflector 104 and emitting light having multiple wavelength bands that propagate in a direction away from light source 102 along a beam propagation path 106 through an optical integrating device 108, of either a solid or hollow type, to create at its exit end a uniform illumination pattern. The uniform illumination pattern is incident on a rotating color wheel 110. An exemplary color wheel 110 includes three regions, each tinted in a different one of primary colors R, G, and B. Light exiting color wheel 110 is imaged by a lens element system 112, reflected off a light reflecting (or transmitting) imaging device 114, and transmitted through a projection lens 116 to form an image. Popular commercially available image projection systems of a type described above include the LP300 series manufactured by InFocus Corporation, of Wilsonville, Oreg., the assignee of this application.

There has been significant effort devoted to developing image projection systems that produce bright, high-quality color images. However, the optical performance of conventional image projection systems is often less than satisfactory. For example, suitable projected image brightness is difficult to achieve, especially when using compact portable color projection systems in a well-lighted room.

Loss of image brightness can, in part, be attributed to the fact that typical image projection systems can utilize only portions of the light beam that are of a specified polarization state or of the color that corresponds to the region of the color wheel aligned with the primary light path at the time of incidence of the light beam on the color wheel. Portions of the light beam that do not correspond to the region of the color wheel aligned with the primary light path at the time of incidence are discarded from the image projection system. As a result, about 60% of the polychromatic light emitted by the primary light source is wasted because it does not pass through the color wheel. This 60% loss of light translates to a significant decrease in image brightness.

One attempt to increase image brightness involved recirculating polychromatic light in the optical integrating device, which was typically a light tunnel 108*a*, while implementing a spiral color wheel having three color regions simultaneously aligned with the primary light path. With reference to FIG. 2, a spiral type color wheel 110*a* includes R, G, and B dichroic coatings arranged in a "spiral of Archimedes" pattern defined by the equation R=a$\theta$. Spiral color wheel 110*a* is located adjacent to an exit end 132 of light tunnel 108*a*, and the three color regions move at a nearly constant speed in the radial direction. The spiral color wheel 110*a* may also include a white region that can be used to increase luminous efficiency in non-saturated images. With reference to FIG. 3, spiral color wheel 110*a* is positioned such that light exiting the exit end of light tunnel 108*a* is simultaneously incident upon all of the color-selective regions of spiral color wheel 110*a*. Further, light tunnel 108*a* includes an entrance end 130 having an entrance aperture through which light emitted by light source 102 propagates. An inner wall 118 of entrance end 130 includes a highly reflective mirror that reflects light that is incident on and reflected by spiral color wheel 110*a*. Thus light is recirculated in light tunnel 108*a*. While highly reflective inner wall 118 facilitates light recirculation, the image projection system suffers a 60% reduction of input etendue due to the requirement that approximately 60% of the area of inner wall 118 of entrance end 130 is covered such that approximately 60% of the light emitted by light source 102 does not enter light tunnel 108*a*. In image projection systems implemented with all but the shortest arc lamps, the efficiency loss due to the etendue reduction is greater than the efficiency increase due to light recirculation within light tunnel 108*a*. High brightness projectors require high-power arc lamps which have arc gaps too large for this prior art method of light recirculation to be of significant value. Further, this attempt did not work with more distributed light sources such as electrodeless microwave discharge lamps.

What is needed, therefore, is an image projection system that exhibits increased optical efficiency and that is implemented with an improved technique for achieving increased image brightness without a significant reduction in etendue.

SUMMARY OF THE INVENTION

An object of the present invention is, therefore, to provide an apparatus and a method for improving the brightness of an image projected by, and the optical efficiency of, an image projection system.

The present invention achieves improved image brightness and optical efficiency by introducing into the image projection system a spatially nonuniform light filter that has multiple spatial regions which transmit light characterized by different sets of optical properties. Each spatial region reflects as unused light components of light characterized by a different set of optical properties and thereby redirects portions of the unused light emitted by the primary light source back into a lamp assembly. The unused light portions may again propagate from the lamp assembly and be transmitted through regions of the light filter characterized by the same set of optical properties, thereby increasing the optical efficiency of the image projection system. Specifically, the light filter reflects the unused portions of light back into the lamp assembly, where the unused portions of light are re-reflected onto optically selective spatial regions of the light filter, resulting in an approximately 30% increase in probability of light transmission. Because recirculation of unused light occurs within the lamp assembly, there is no significant reduction in etendue.

In a first preferred embodiment, the spatially nonuniform light filter is of an interference filter type that reflects certain colors of light while transmitting other colors of light. A preferred interference filter is a spiral color wheel having more than two color selective regions.

In a second preferred embodiment, the spatially nonuniform light filter is of a polarizing filter type having optically selective regions that pass light in certain polarization states while reflecting light in other polarization states. An exemplary polarizing filter contains a pattern of grids that are orthogonally arranged to create perpendicularly related polarization directions.

Additional objects and advantages of this invention will be apparent from the following detailed description of preferred embodiments thereof, which proceeds with reference to the accompanying drawings.

BRIEF DESCRIPTION OF THE DRAWINGS

FIG. 2 is a schematic view of the surface of a prior art spiral color wheel.

FIG. 3 is a schematic view of the spiral color wheel of FIG. 2 (with the center section cut away) positioned adjacent to a light tunnel.

FIG. 6 is a schematic isometric view of a second embodiment of the image projection system of the present invention.

FIG. 7 is a schematic perspective view of an exemplary light filter that may be implemented in the image projection system of FIG. 6.

FIG. 8 is a schematic fragmentary side elevation view of an alternative implementation of the image projection system of FIG. 6.

DETAILED DESCRIPTION OF THE PREFERRED EMBODIMENTS

Figure 1:
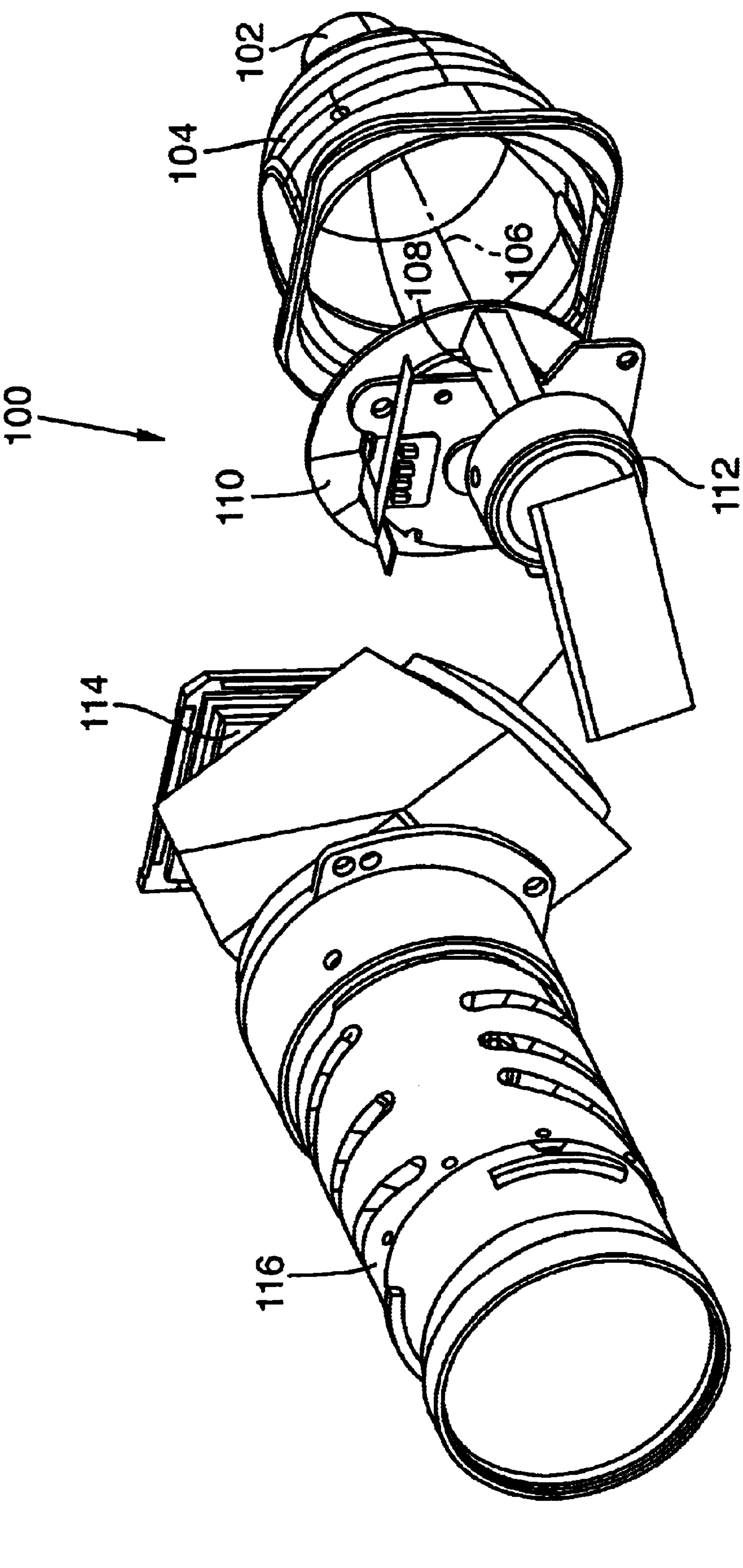
FIG. 1 is an isometric pictorial view of a prior art color image projection system.
Figure 4A:
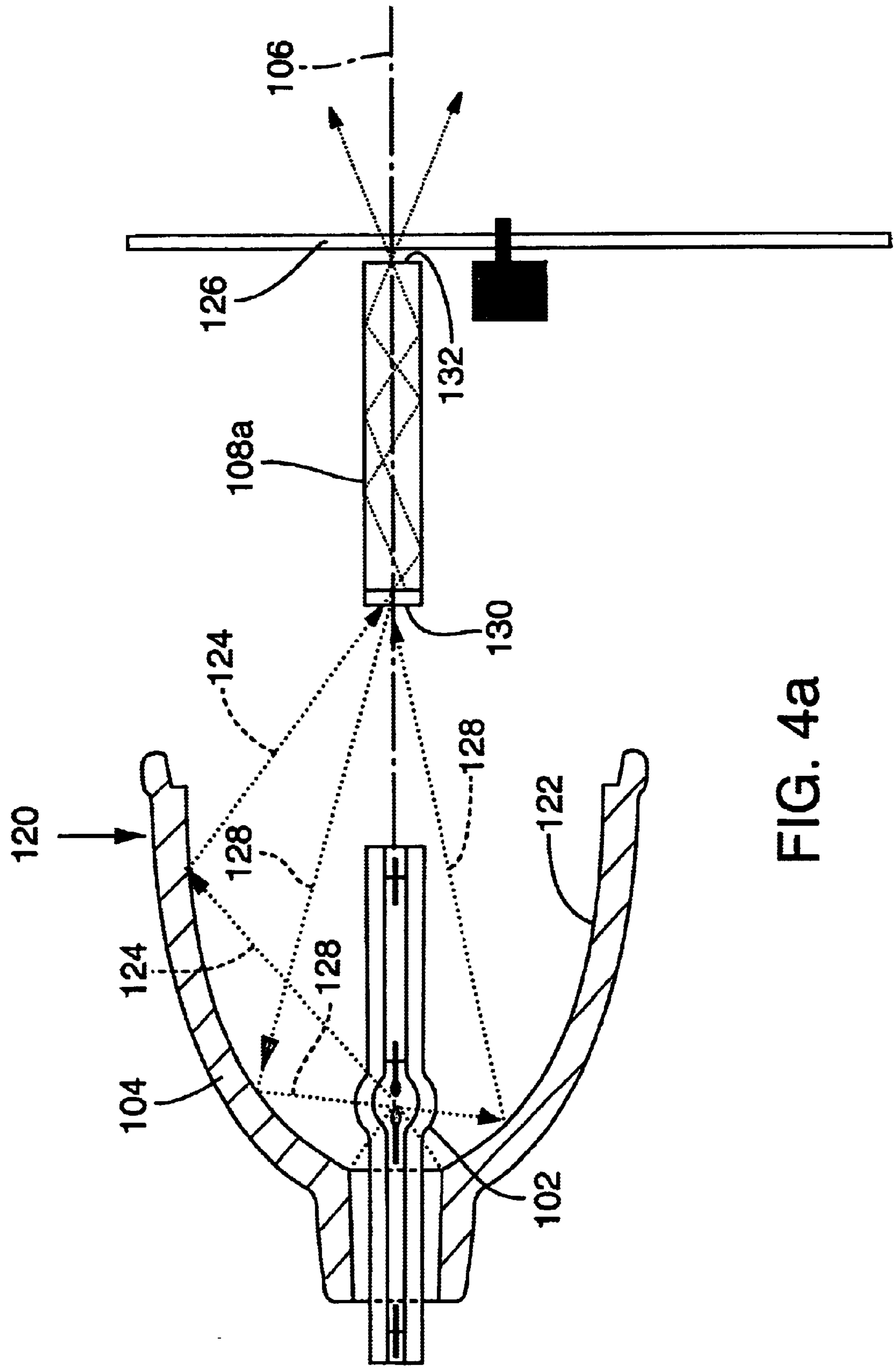
FIGS. 4*a* and 4*b* are schematic side elevation views of alternative implementations of a first embodiment of the image projection system of the present invention.

With reference to FIG. 4*a*, a lamp assembly 120 includes primary light source 102, which emits polychromatic light that reflects off an inner surface 122 of light reflector 104 and propagates in a direction away from light source 102 along beam propagation path 106. Primary light source 102 is preferably a high-brightness, high-efficiency lamp system having a long-life burner. An electrodeless microwave discharge lamp is preferred because the absence of electrodes eliminates the possibility of collision of redirected light emissions with lamp electrodes. Such collisions would decrease the optical efficiency of the image projection system. Additionally, an electrodeless microwave discharge lamp does not require the use of a separate optical integrating device 108, such as a light tunnel 108*a*, to generate an illumination patch. Other exemplary primary light sources include high-pressure mercury arc lamps and standard arc lamps. A light tunnel 108*a* is preferably included in an image projection system that is implemented with an arc lamp.

Figure 5A:
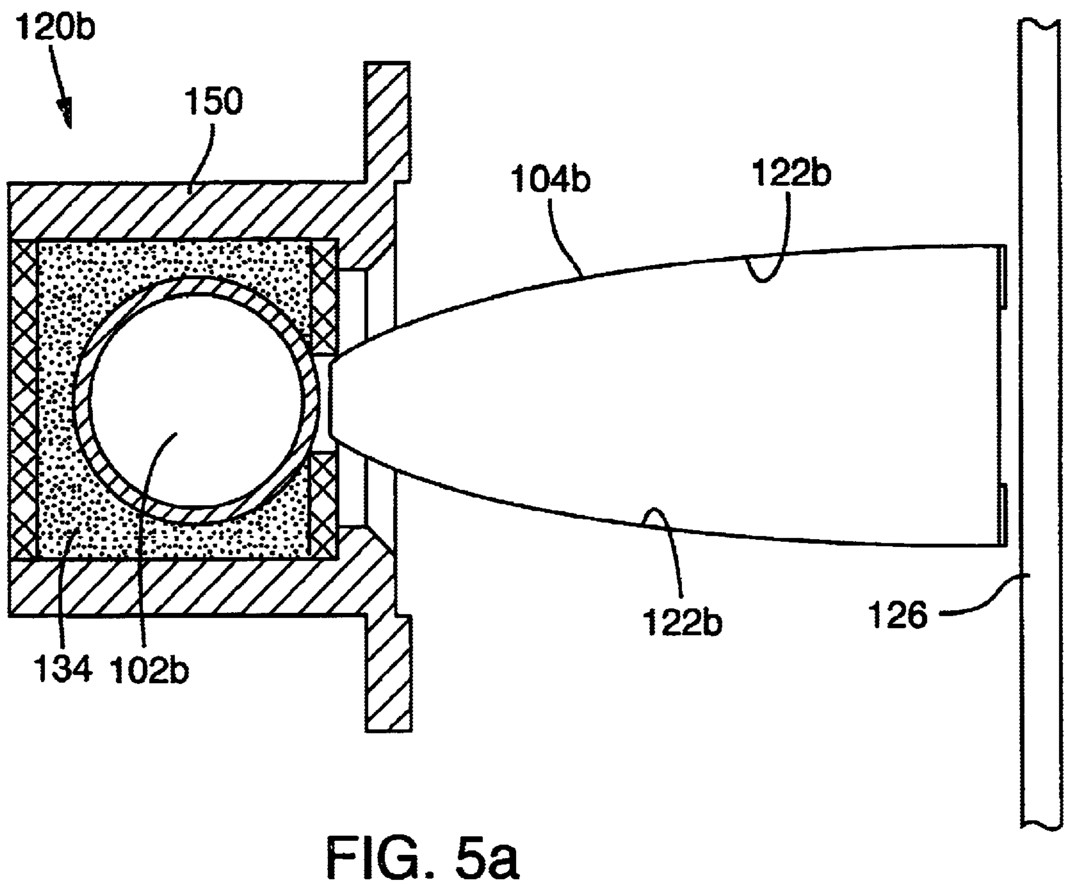
FIGS. 5*a* and 5*b* are schematic side elevation views of alternative implementations of the image projection systems of the present invention.
Figure 5B:
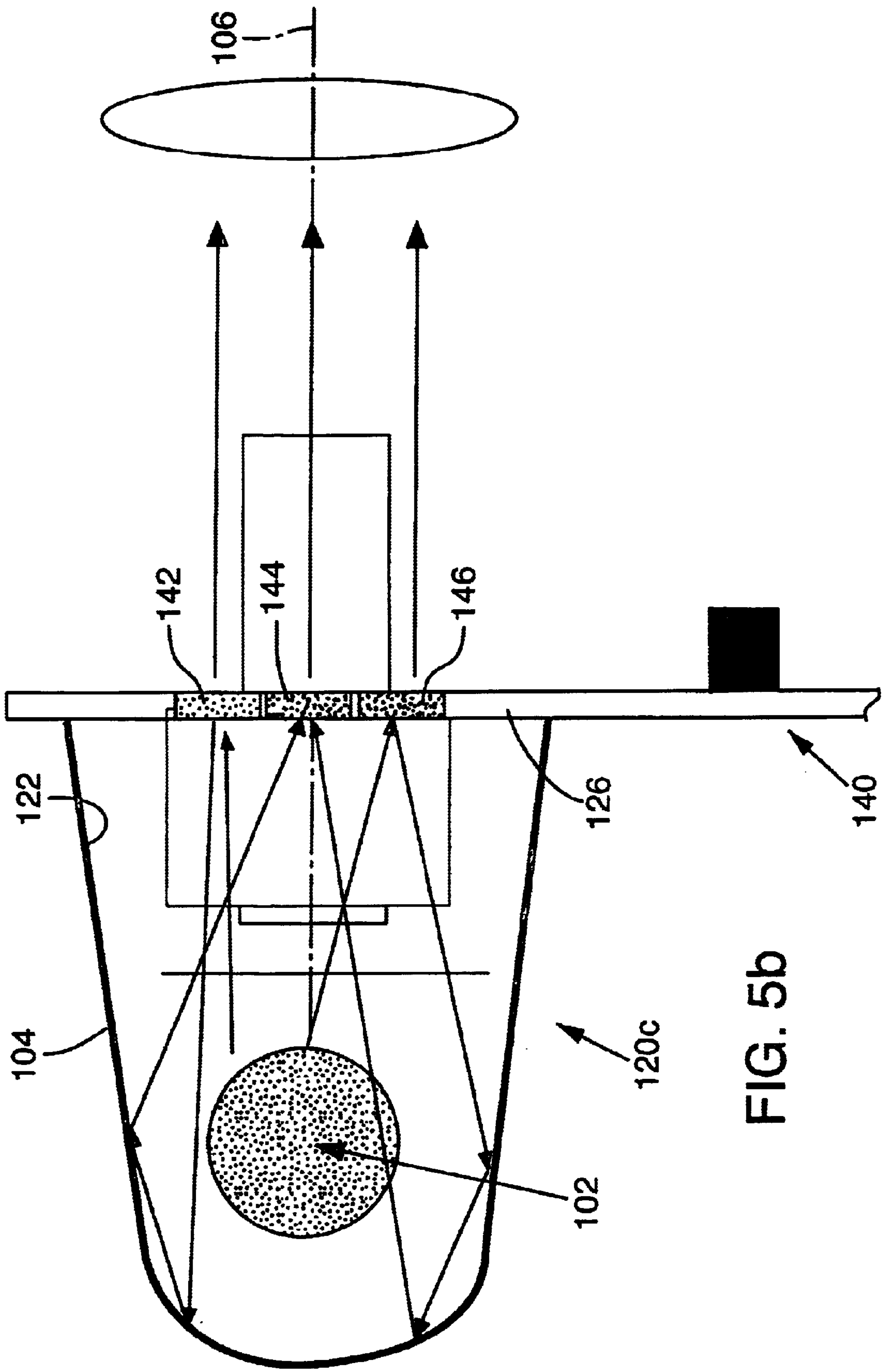

Light reflector 104 focuses polychromatic light (indicated by light rays 124) emitted by primary light source 102 onto either a spatially nonuniform light filter 126, as shown in FIG. 5*b*, or onto an entrance end 130 of light tunnel 108*a*, which directs the polychromatic light onto spatially nonuniform light filter 126. Spatially nonuniform light filter 126 is preferably one of two types of light reflecting filters, which are described below with reference to FIGS. 5–7. Light reflector 104 is preferably an annular reflector of hollow shape positioned about and spaced from primary light source 102. Depending on the design goals and the details of the downstream optics, light reflector 104 may be of any suitable shape including ellipsoidal, paraboloidal, spherical, generally aspheric, or faceted form. Inner surface 122 of light reflector 104 reflects and redirects light (indicated by light rays 128) reflected by light filter 126. Inner surface 122 is preferably of uniform smoothness. Other characteristics such as size, length, focal length, and thermal properties are determined by the design goals of the image projection system.

With reference to FIG. 5*a*, an alternative implementation lamp assembly 120*b* includes a sulfur bulb 102*b* that is surrounded by a bulb fill 134. Bulb fill 134 may be any of a variety of bulb fills including a minimally reflective single element fill or a conventional mercury or metal halide fill. The fill preferably operates at a low pressure. Bulb 102*b* is also surrounded by a reflective jacket 150, preferably made of ceramic, having an entrance aperture through which light emitted by sulfur bulb 102*b* propagates into light reflector 104*b*. Light reflected by light filter 126 undergoes multiple reflections off inner walls 122*b* such that the reflected light is again incident on light filter 126. An exemplary commercially available lamp assembly is the Bytelight™ manufactured by Fusion Lighting. Lamp assembly 120*b* has various advantages over other lamp assemblies. One advantage is increased lamp life, which can be greater than 20,000 hours. Another advantage is highly consistent, high brightness output, as great as 1500–7000 lumens over the course of the bulb's life. A final advantage is increased light uniformity as compared to prior art discharge lamps, which typically have a localized bright spot.

As shown in FIG. 5*b*, an alternative implementation lamp assembly 120*c* includes an electrodeless light source 102 positioned in light reflector 104.

As shown in FIG. 4*a*, an image projection system of the present invention may include an optical integrating device 108*a* positioned between lamp assembly 120 and light filter 126. A preferred optical integrating device 108 is a light tunnel 108*a*, preferably a solid or hollow glass rod whose interior surfaces have been coated with a highly reflective dielectric coating. Also, the glass rod preferably includes an entrance aperture that can be adjusted to maximize the efficiency of the image projection system. Polychromatic light emitted by primary light source 102 reflects off of light reflector 104 and converges to a focus at an entrance end 130 of light tunnel 108*a*. The polychromatic light propagating through light tunnel 108*a* undergoes multiple reflections off of its walls so that the light emitted at an exit end 132 of light tunnel 108*a* is of uniform intensity.

Figure 4B:
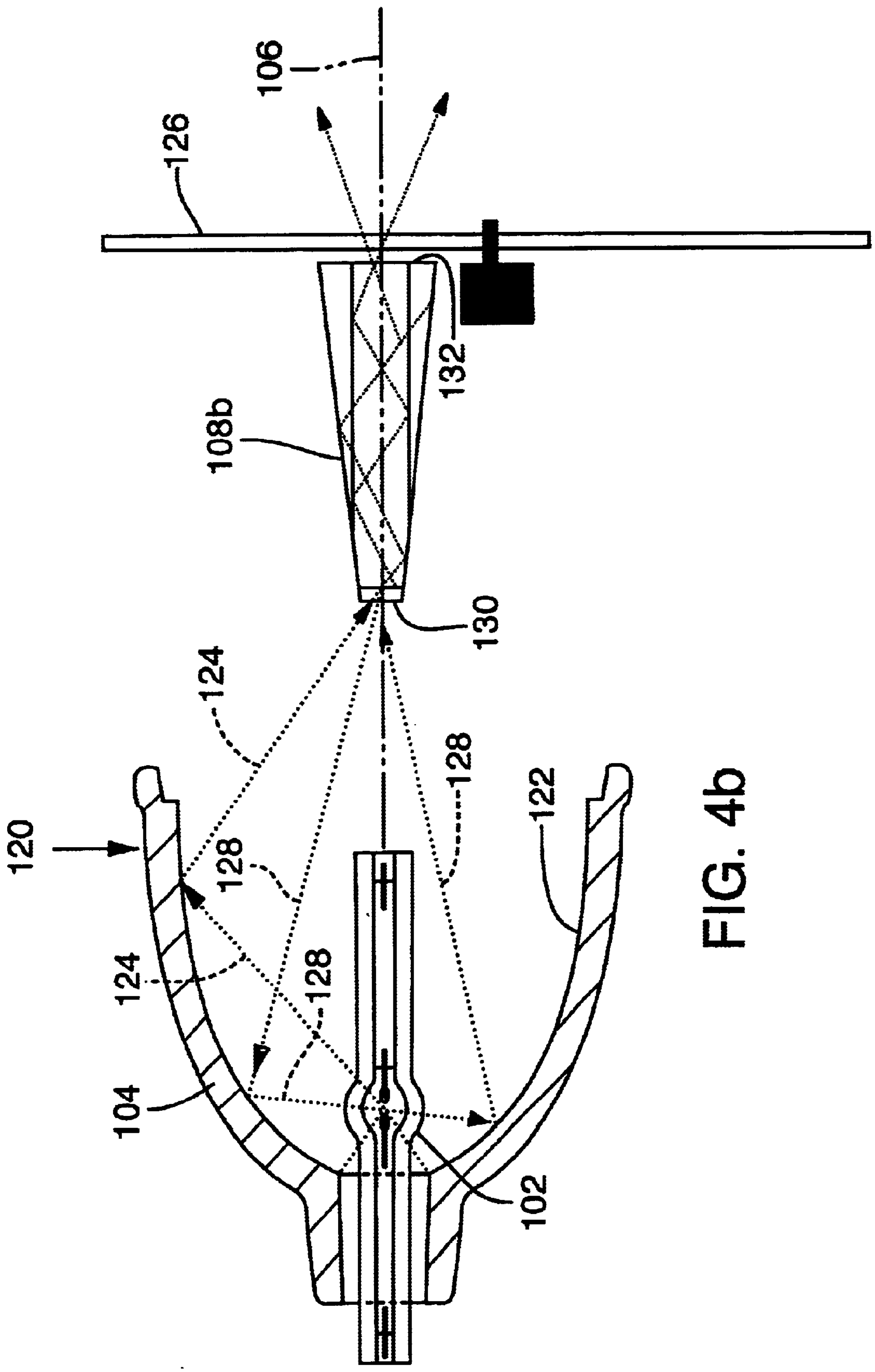

An alternative implementation of optical integrating device 108 is the trapezoidal-shaped light tunnel 108*b* shown in FIG. 4*b*. The entrance end 130 of light tunnel 108*b* preferably corresponds to the size of the light spot emitted by light source 102, which is dictated by the type of light source implemented in the image projection system. Light tunnel 108b maximizes the amount of light that is recirculated while reducing the likelihood that the recirculated light will be incident on the electrodes contained in the light source.

With reference to FIG. 5*b*, the image projection system of the present invention also includes a spatially nonuniform light filter 126 that has multiple regions that transmit light characterized by different sets of optical properties. Each of the two preferred embodiments of light filter 126 has optically selective spatial regions 142 and 144 that transmit light beam portions characterized by different ones of two sets of optical properties and reflect light beam portions characterized by the set of optical properties of the light transmitted by the other spatial region. Light filter 126 is positioned to direct the light beam portions reflected by spatial regions 142 and 144 in directions generally opposite to the direction of propagation along beam propagation path 106. Light filter 126 and light reflector 104 are positioned in optical association with each other such that at least some of the light beam portions reflected by spatial regions 142 and 144 reflect off of inner surface 122 of light reflector 104 and propagate through the one of spatial regions 142 and 144 other than that which reflected the light beam portions.

FIGS. 4*a*, 4*b*, 5*a*, and 5*b* are schematic views of the alignment of lamp assembly 120 and a color wheel type light filter implemented in four exemplary image projection systems of the present invention. The image projection system shown in FIG. 4*a* includes light tunnel 108*a*. The image projection system shown in FIG. 4*b* includes light tunnel 108*b*. FIGS. 5*a* and 5*b* show image projection systems without a light tunnel. In FIGS. 4*a*, 4*b*, 5*a*, and 5*b*, light filter 126 is positioned transversely of beam propagation path 106 to receive light reflected by inner surface 122 of light reflector 104.

In a first preferred embodiment, light filter 126 is a spatially nonuniform color wheel of an interference filter type that is wavelength selective such that the color wheel transmits light of certain wavelengths and reflects light of other wavelengths back into lamp assembly 120. Thus, the color wheel reflects certain colors of light and transmits other colors of light. The color wheel is preferably positioned very close to exit end 132 of optical integrating device 108 or light reflector 104. The gap between the two components is preferably sufficiently small to prevent undesirable light "leakage" that can occur around the perimeter of the interface between the color wheel and exit end 132 or between the color wheel and light reflector 104. When polychromatic light reaches the color wheel, light of a given color propagates through the one of spatial regions 142 and 144 that is covered by a transmissive coating of the corresponding color and reflects off the other one of spatial regions 142 and 144. For example, in an image projection system having a spiral color wheel light filter, red light is transmitted through the spatial region of the spiral color wheel covered by the red dichroic coating while all other colors of light are reflected back into lamp assembly 120. The reflected light reflects off of inner surface 122 of light reflector 104 and is thereby directed in the direction of beam propagation path 106 onto one of spatial regions 142 and 144 of the color wheel. A portion of the reflected light may be incident on a corresponding spatial region of the color wheel resulting in transmission of that portion of the reflected light through the image projection system. For example, reflected blue light will be transmitted by the spatial region of the color wheel covered by a blue dichroic coating. This effect occurs continuously with light of all three colors. This process is repeated several times until all the light emitted by primary light source 102 is transmitted, absorbed, or scattered by or through the color wheel. In an alternative implementation of an image projection system of the present invention as shown in FIG. 5*b*, light filter 126 has three optically selective spatial regions 142, 144, and 146 but operates in a manner analogous to that described above.

A preferred interference type light filter is a spiral (or scrolling) color wheel having R, G, and B color regions. The spiral color wheel may also include a white ("W") region, whose presence increases the luminous efficiency of non-saturated images. Use of the spiral color wheel has three advantages: (1) all colors are simultaneously present in the illumination area so less light is wasted as compared to a conventional field sequential image projection system; (2) there is a reduction in the occurrence of "color separation artifacts" caused by quick eye movements or a fast changing screen; and (3) small spiral color wheels are commercially available and thereby enable the design of a more compact image projection system. An exemplary commercially available spiral color wheel is manufactured by Unaxis. Other exemplary interference type light filters include rotating color drums, dichroic filters, and color filters with two or more color bands.

In a second preferred embodiment of the present invention, shown in FIG. 6, light filter 126 is of a light polarizing filter type having regions that transmit light in certain polarization states and reflect light in other polarization states. Portions of light in a polarization state that differs from that transmitted by the one of spatial regions 142 and 144 on which the light is incident are reflected into lamp assembly 120, where they reflect off light reflector 104 and are redirected to light filter 126. Light filter 126 is of a reflective wire-grid polarizer type having a pattern of grids orthogonally arranged to create orthogonally aligned polarization directions. An exemplary commercially available linear polarizing filter is the High Transmission Proflux polarizer (Part No. PPLD2C manufactured by Moxtek), a diagram of which is shown in FIG. 7. Spatial regions 142 and 144 shown in FIG. 6 indicate, respectively, horizontal and vertical polarization directions. Light filter 126 can, in cooperation with other optical components, operate with light in other polarization states, including circular or elliptical.

Light filter 126 is preferably positioned very close to the exit end of optical integrating device 108 (if present) or light reflector 104. Alternatively, light filter 126 may be positioned within lamp assembly 120, as shown in FIG. 8.

It will be obvious to those having skill in the art that many changes may be made to the details of the above-described embodiments of this invention without departing from the underlying principles thereof. For example, multiple light filters may be implemented as necessary to maximize the optical goals of the image projection system. The scope of the present invention should, therefore, be determined only by the following claims.

What is claimed is:

1. A method of increasing the brightness of an image projected by, and the optical efficiency of, an image projection system implemented with a lamp assembly including a primary light source and a light reflector having an inner surface, comprising:

producing a light beam having light beam portions characterized by optical properties and transmitting the light beam through the lamp assembly;

directing the light beam for incidence on a spatially nonuniform light filter, the light filter having first and second spatial regions that transmit light characterized by respective first and second different sets of optical properties, the first spatial region reflecting in directions generally opposite to the beam propagation direction of the light beam portions characterized by the second set of optical properties, and the second spatial region reflecting in directions generally opposite to the beam propagation direction of the light beam portions characterized by the first set of optical properties; and redirecting at least some of the light beam portions reflected by the first and second spatial regions into the lamp assembly so that at least some of the light beam components reflected by the first and second spatial regions of the light filter reflect off of the inner surface of the light reflector and propagate through the respective second and first spatial regions of the light filter to increase by light recirculation the optical efficiency of, and the brightness of the image produced by, the image projection system.

2. The method of claim 1, in which the image projection system includes a light integrator having an entrance end positioned adjacent to the light reflector and an exit end positioned adjacent to the light filter, the entrance end having an aperture through which polychromatic light emitted by the primary light source propagates, the aperture having dimensional properties that enhance recirculation of the light beam components reflected by the first and second spatial regions into the lamp assembly.

3. The method of claim 1, in which the first and second sets of optical properties include a light polarization property, the first and second sets representing light beam portions in different ones of orthogonally related polarization states.

4. The method of claim 3, in which the light polarization property represents linear polarization and the first and second sets of optical properties represent light beam portions in different ones of orthogonally related polarization directions.

5. The method of claim 1, in which the first and second sets of optical properties include different wavelength bands, the first set representing light beam portions in a wavelength band that is different from that of the light beam portions in the second set.

6. The method of claim 5, in which the first set of optical properties includes wavelength bands within a spectral range encompassing red light and the second set of optical properties includes wavelength bands within a spectral range encompassing green light.

7. The method of claim 1, in which the spatially nonuniform light filter is implemented with a pattern of orthogonally arranged wire grids that impart to incident light a light polarization property.

8. The method of claim 1, in which the primary light source includes at least one of a microwave discharge lamp, a high-pressure mercury lamp, and an arc lamp.

9. The method of claim 1, in which the spatially nonuniform light filter includes more than two spatial regions that transmit light characterized by more than two different sets of optical properties.

10. The method of claim 1, in which the image projection system further includes an optical integrating device through which the polychromatic light propagates, the optical integrating device positioned adjacent to the light filter and the light reflector.

* * * * *